(12) United States Patent
Cordery et al.

(10) Patent No.: US 6,954,742 B2
(45) Date of Patent: Oct. 11, 2005

(54) CLOSED LOOP POSTAGE METERING SYSTEM

(75) Inventors: Robert A. Cordery, Danbury, CT (US); Murray D. Martin, Ridgefield, CT (US); Leon A. Pintsov, West Hartford, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/622,331

(22) Filed: Jul. 18, 2003

(65) Prior Publication Data

US 2004/0093312 A1 May 13, 2004

Related U.S. Application Data

(60) Provisional application No. 60/397,516, filed on Jul. 18, 2002.

(51) Int. Cl.[7] ............................................. G07B 17/00
(52) U.S. Cl. ....................................... 705/402; 705/30
(58) Field of Search .......................... 705/30, 400, 401, 705/402, 404

(56) References Cited

U.S. PATENT DOCUMENTS

| | | | | |
|---|---|---|---|---|
| 3,792,446 A | * | 2/1974 | McFiggins et al. | 705/403 |
| 4,097,923 A | * | 6/1978 | Eckert et al. | 705/403 |
| 4,122,532 A | * | 10/1978 | Dlugos et al. | 705/409 |
| 4,752,950 A | | 6/1988 | Carpentier | 379/106.11 |
| 4,873,645 A | * | 10/1989 | Hunter et al. | 700/231 |
| 5,019,991 A | | 5/1991 | Sansone et al. | 705/407 |
| 5,043,908 A | * | 8/1991 | Manduley et al. | 700/227 |
| 5,072,397 A | | 12/1991 | Barns-Slavin et al. | 705/402 |
| 5,072,401 A | * | 12/1991 | Sansone et al. | 700/219 |
| 5,229,932 A | | 7/1993 | Connell et al. | 705/1 |
| 5,309,363 A | * | 5/1994 | Graves et al. | 705/403 |
| 5,444,630 A | | 8/1995 | Dlugos | 705/402 |
| 5,448,641 A | * | 9/1995 | Pintsov et al. | 380/51 |
| 5,475,603 A | | 12/1995 | Korowotny | 700/213 |
| 5,792,460 A | * | 8/1998 | Boime | 424/192.1 |
| 5,995,950 A | | 11/1999 | Barns-Slavin et al. | 705/402 |
| 6,085,181 A | * | 7/2000 | Gravell et al. | 705/408 |
| 6,098,058 A | * | 8/2000 | Gravell et al. | 705/410 |
| 6,151,590 A | * | 11/2000 | Cordery et al. | 705/60 |
| 6,151,591 A | * | 11/2000 | Pierce et al. | 705/401 |
| 6,385,504 B1 | * | 5/2002 | Pintsov et al. | 700/226 |
| 6,463,354 B1 | * | 10/2002 | Pintsov | 700/227 |
| 6,532,452 B1 | | 3/2003 | Pintsov et al. | 705/401 |
| 6,592,027 B2 | | 7/2003 | Kovlakas | 235/375 |
| 6,643,133 B1 | * | 11/2003 | Liu | 361/704 |

FOREIGN PATENT DOCUMENTS

EP 1111376 A2 7/2001

OTHER PUBLICATIONS

"Mailing for less means mailing smarter" (One–to–One Marketing Inc. mailing services) *LI Business News*, n38, p45(1), Sep. 29, 1993.

* cited by examiner

*Primary Examiner*—Edward Cosimano
(74) *Attorney, Agent, or Firm*—Charles R. Malandra; Angelo N. Chaclas

(57) ABSTRACT

A closed loop postage metering system includes networked meters that provide mailers and/or recipients the capability to request additional or modified services during processing of a mail piece by a carrier. The networked meter allows the Post to charge the mailer, or even the recipient for these services or to provide them with a refund or credit. The services can include changing the processing of the mail piece. Further, the closed loop postage metering system enables more precise methods of paying for services when multiple carriers handle a mail piece. A special case of such multiple carriers handling is the handling of international mail.

7 Claims, 10 Drawing Sheets

Fig. 7

| | Mail Item requested service | Actions on Mail Piece Content | Actions on Image of Mail Item or Content | Attributes | Standard of Evidence |
|---|---|---|---|---|---|
| Event 1 F/C scan of collection mail item | Normal process | N/A | No action | Date/Time/ Location | Mail Item ID Attributes |
| Event 2 Remittance mail intercepted | Divert and Open at first control point | Scan Content | Send Image of the Content to specified e-address | Date/Time/ Location Image | Send all data digitally signed and encrypted |
| Event 3 Receipt by recipient | Notify sender of hand over to recipient | N/A | Scan Mail Item | Date/Time/ Location and condition | Send all data digitally signed | ant
CLOSED LOOP POSTAGE METERING SYSTEM

CROSS-REFERENCE TO RELATED APPLICATIONS

This application claims priority from U.S. Provisional Application Ser. No. 60/397,516, filed Jul. 18, 2002 the specification of which is hereby incorporated by reference.

FIELD OF THE INVENTION

The invention disclosed herein relates generally to postage metering systems and more particularly to networked postage metering systems.

BACKGROUND OF THE INVENTION

For more than eighty years, postage meters have been used to evidence postage payment on mail items before the mail items are inducted into a mail stream processed by postal infrastructure. For more than sixty years postage meters were stand-alone devices that had to be hand carried to a Post facility for the purpose of refilling the postage meter with postage funds. Postage meters, using postage funds stored in the postage meter, securely account for the payment of postage that is printed on a mail item.

When remote resetting of postage funds in the meter was implemented, postage meters began to communicate with a remote data center to refill the postage meter with funds. At first, the communication was indirect requiring a user to enter a code received from a postage refill center. In a similar manner, postage rates were updated in the postage meters by manual entry or replacement of removable storage devices that contained postage rates. See for example, U.S. Pat. Nos. 3,792,446, and 4,097,923. In some cases, rate information was stored in a scale that was coupled to the postage meter.

Eventually, it became know for postage meters to communicate directly with a data center for both postage funds refills and rate downloads. See, for example, U.S. Pat. Nos. 4,122,532, 5,729,460, 5,448,641 and 5,309,363. When postage meters began to communicate directly with a data center, information stored in the postage meters, for example, meter usage, was uploaded to the data center. This collection of postage meter information at the data center is commonly referred to as data capture. See, for example, U.S. Pat. Nos. 4,752,950, 4,873,645, 5,072,401 and 6,463,133.

The tracking of mail while being process by a Post infrastructure known. In U.S. Pat. No. 5,043,908, a self-monitoring mail delivery system is described wherein mail is tracked as it passes through multiple delivery stages. A schedule is created of expected arrival times at each stage. Should a mail piece not arrive on time, the system is alerted to initiate a search for the late or missing mail piece, or to take other corrective action, such as expediting delivery of late pieces. A data center monitors the operations and provides management information to help enhance deliveries. Printing a unique number on mail item is also known. See U.S. Pat. No. 6,385,504. The USPS and other carriers have provided track and trace service at different levels of mail or package processing. Most recently, the USPS introduced an new product CONFIRM that helps track mailpieces sent by First-Class Mail or Standard Mail using PLANET Codes.

It is known for postage metering systems to print value-added service requests on a mail items. For example, U.S. Pat. Nos. 6,532,452 and 6,463,354 respectively describe sending e-mail notices to a mailer relating to delivery confirmation or to an intended recipient of a mailpiece relating to expected delivery.

Various forms of networked postage metering systems are known. See, for example, U.S. Pat. Nos. 6,151,591, 6,151,590, 6,098,058, 6,085,181 and 6,081,795. Pitney Bowes Inc. of Stamford, Conn., recently introduced a series of digital mailing products referred to as DM Series machines featuring INTELLILINK™, which is an intelligent, network architecture that provides a "gateway" to a suite of mail services and applications.

Heretofore, postage meters typically provided accounting and evidence of payment for mail services. Postage meters may provide certain information to Posts concerning outgoing mail, but do not currently make use of and do not have access to information gathered about the mail by the Postal Service (also referred to herein as the Post) and/or a third party, such as the meter manufacturer, who is administering the accounting performed by the meter, (also referred to herein as the "Provider"). Except for evidencing payment for a particular type of service, postage meters do not currently manage mail once the mail is inducted into the mail processing system.

The USPS provides a workshare discount to a mailer when the mailer inducts a batch of mail into the mail stream. The USPS tests the submitted mail for compliance with discount eligibility requirements. The USPS uses the MERLIN system to verify compliance. The resulting process is cumbersome and expensive for mail acceptance and for reconciliation of disputed payments for both the mailer and the USPS. Currently, the mailer and the USPS perform the following steps: the mailer picks a workshare discount level for a batch of mail, prepares the batch of mail according to discount requirements, prepares necessary documentation for batch, calculates the postage for the batch, and submits the batch to the USPS; the USPS verifies the workshare level of the batch, and if the batch does not meet requirements, then the USPS determines the additional charge; the mailer pays the required postage; and the USPS accepts the mail batch and payment. Approximately 10% of discounts are improperly claimed. Uncollected revenue could be a billion dollars. See the November 1999 GAO report GAO/GGD-00-31 U.S. POSTAL SERVICE, CHANGES MADE TO IMPROVE ACCEPTANCE CONTROLS FOR BUSINESS MAIL.

Mail acceptance verification processes such as MERLIN are expensive, labor and time intensive and potentially inaccurate. The Post has a strong incentive to adjust the verification system to assure a very high level of performance in mail processing. Mailers thus spend funds to produce very high quality mail to pass the verification system. Further, surcharges are levied on mail that performs well in the processing system. This either results in excess payments or withdrawal of the mail batch. In either case, the problem reduces the overall effectiveness of the postal system. The present system is thus not efficient for the complete postal process of producing, processing and delivering mail. Payment of a surcharge is awkward because the employee who brings the mail for submission will generally not have authority to modify the payment. As a result the mailer may withdraw the mail batch temporarily or permanently.

From the foregoing, it is clear that postage meters are known to communicate information in the postage meters to a data center or a Post. However, it is not known for a Post or data center to communicate to a postage meter any information relating to mail items that were processed by the postage meter.

SUMMARY OF THE INVENTION

The present invention provides a system and method for performing closed loop accounting of a postal transaction, i.e. adjusting the initial accounting associated with a mail item based on the success, delay or failure of service by the carrier. The present invention further provides the capability to request additional or modified services for a mail item after the initial accounting for and induction of the mail item. The present invention also provides a closed loop accounting system and method wherein the mailer or recipient can obtain postal discounts based on workshare information provided to the carrier. The closed loop accounting system and method of the present invention is suitable for multi-carrier transactions, including international mail handling transactions.

The present invention includes a networked postage meter as part of a closed loop postage metering system that transforms the postage meter into a mail communication system management tool. It improves functionality of postage meters by allowing a meter to send and receive information about desired and provided mail services and to make the information available to a user. Additionally, the postage meter receives information about payment corrections from the Post or from a Provider, and completes the accounting for the transaction and provides evidence of the completed transaction back to the Post or Provider.

In a mail finishing process, the postage meter provides information to the mailer in electronic form concerning finished mail, including marketing data, special service requests, and payment information. The postage meter receives information about the performance of the requested services and accounting information related to payment for such services. The postage meter then acts on the received information by sorting it, alerting the mailer to any exceptions, displaying information and completing accounting for transactions. The system allows for automatic metering of additional payment or refund in each case where the final price depends on information that was not available at the time of mail production.

The present invention provides mailers and/or recipients with the capability to request additional or modified services during processing of individual mail pieces. The closed loop system allows a Post to charge the mailer or even the recipient for these services. The services can include changing the processing of the mail piece. Furthermore, the closed loop system provides a more precise method of paying for services when multiple carriers handle a mailpiece.

The present invention also provides a system and method that evaluates each mail piece in a batch during normal mail processing for compliance with workshare discount requirements. One area of compliance verification is readability of bar codes such as ZIP Codes, indicia bar codes, PLANET Codes for the CONFIRM service and delivery confirmation. A second area of compliance verification is readability of addresses, human-readable indicia information and other mail piece data. Yet another area is correctness of addresses and correctness of presorting. The Post tracks the mail from a batch into the mail processing system, and measures the performance during processing. In accordance with the present invention the results of the verification are used to determine the final payment for the batch of mail. The system further monitors performance of postal processing equipment and allows for correction of any surcharge due to poorly performing equipment. The funds for the difference between the claimed and prepaid discount rate and the full rate may be held in an escrow account or a trusted device to simplify and assure appropriate payment.

Thus, the present invention provides a system and method for evaluating mail pieces that are submitted for worksharing discounts, as well as verification of applicable surcharges, and the retaining of funds in an escrow account or a trusted device to simplify and assure appropriate payment. The present invention overcomes problems associated with the current workshare system by simplifying the acceptance procedures, ensuring accurate charges, simplifying the payment and reconciliation process and providing accurate data for dispute resolution.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 7 is a table of examples of control functions triggered by events associated with conditional value added services;

DETAILED DESCRIPTION OF THE PRESENT INVENTION

The present invention transforms the postage meter into a mail communication system management tool. It improves functionality of meters by allowing a meter to send and receive information about desired and provided mail services and to make the information available to the user. Further, the meter receives information about payment corrections from the Post or from the Provider and completes accounting for transactions related to such corrections.

Typically, in a mail finishing process a meter provides information to the mailer in electronic form concerning finished mail, including marketing data (commonly referred to in the industry as data capture), special service requests, and payment information. In accordance with the present invention, the meter, as part of the closed loop postage metering system, receives information about services preformed or not performed and accounting information related to payment for such services. The meter then acts on the received information by sorting it, alerting the mailer to any exceptions, displaying information and completing accounting for transactions related to such services. The closed loop postage metering system allows for automatic metering of payment or refund in cases where the final price depends on information not available at the time of mail production. Examples of services that may be requested are: delivery confirmation, track and trace, change of address, address cleansing, insurance and date-certain delivery.

Figure 1:
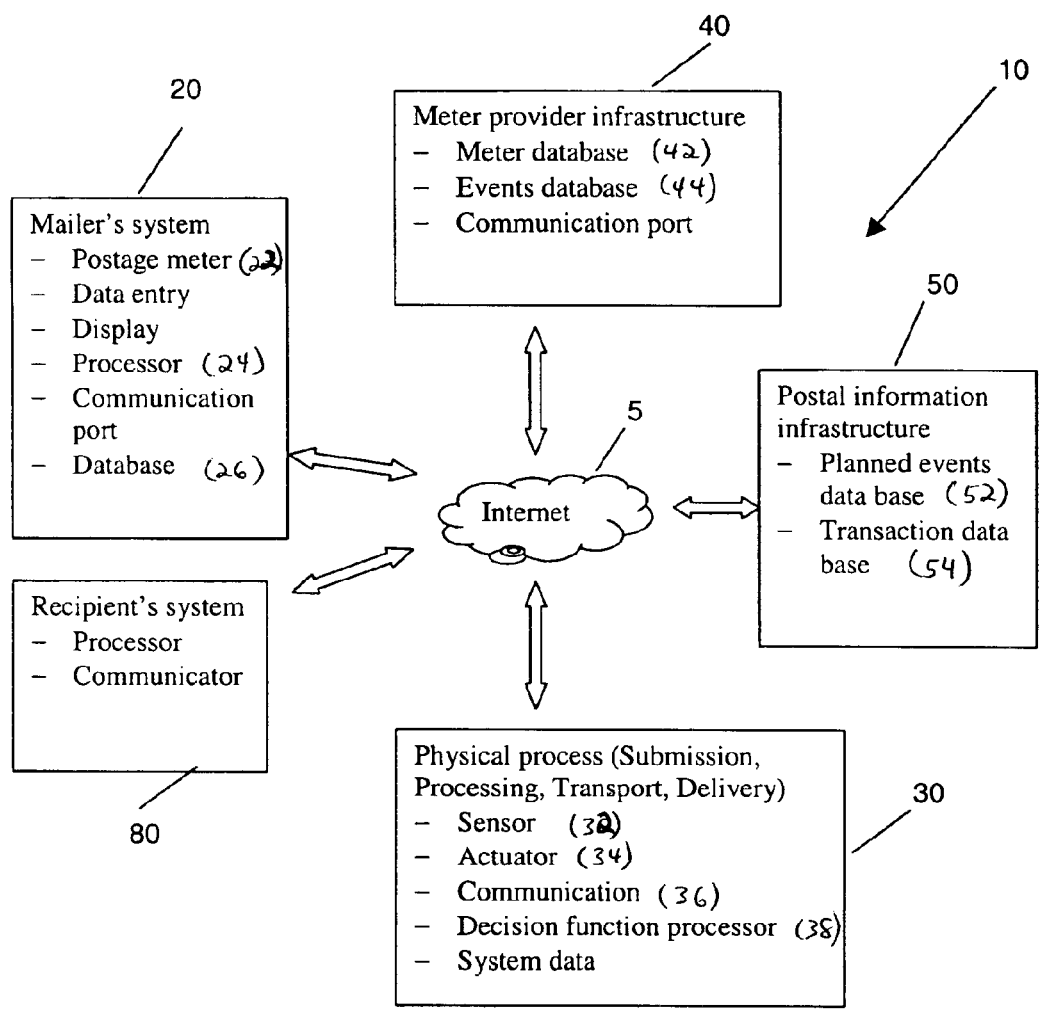
FIG. 1 is a block diagram of a closed loop postage metering system in accordance with the present invention.
Figure 2:
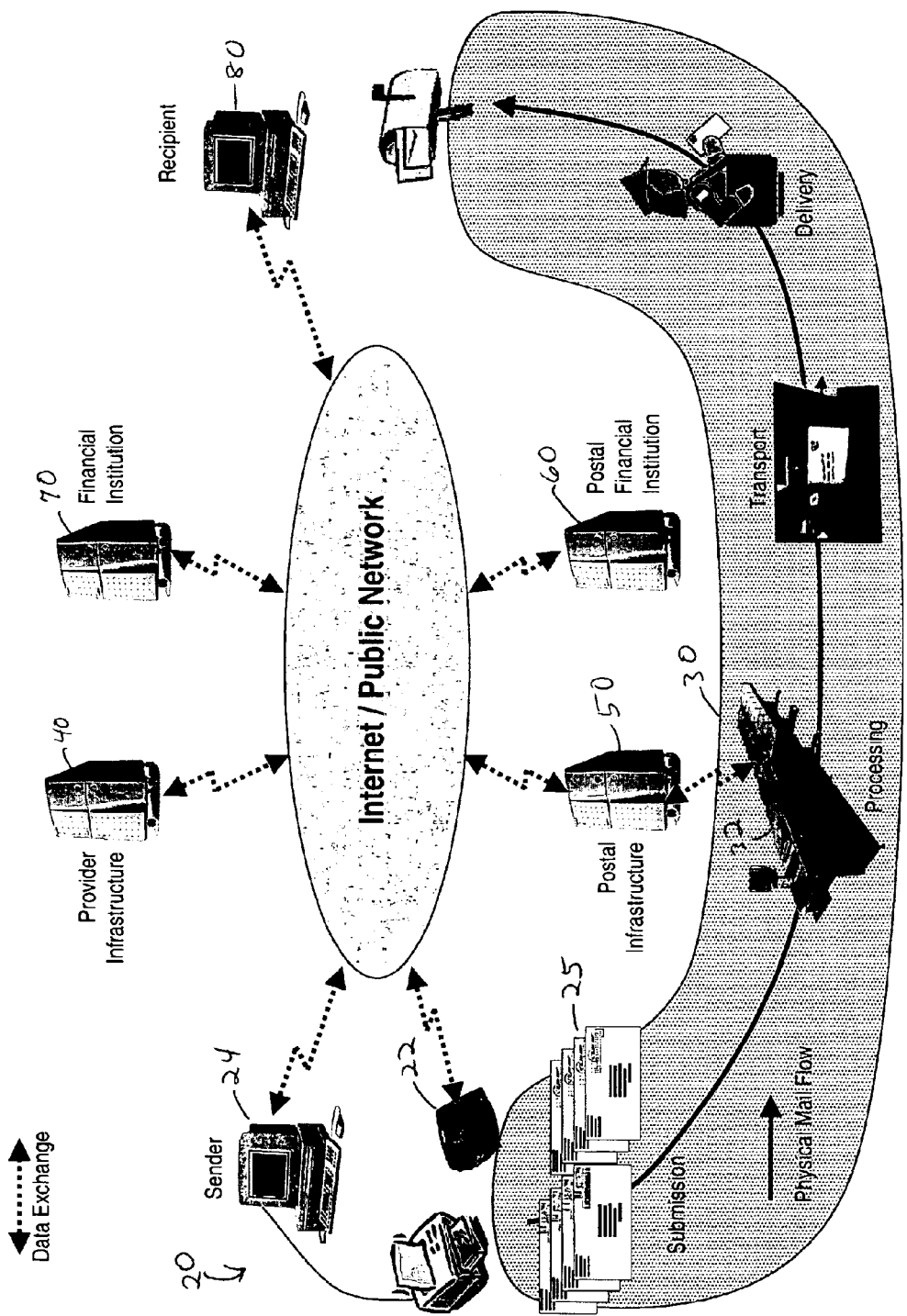
FIG. 2 is a more detailed block diagram of a closed loop postage metering system of FIG. 1 showing the process flow of the mail and information related thereto.

Referring now to FIGS. 1 and 2, the closed loop postage metering system 10 in accordance with the present invention is shown in block diagram form, wherein the following elements of the system are in communication through the Internet and/or other networks 5. The mailer's system 20 includes a postage meter 22, a PC 24, and a database of mail planned events 26. The database entry for an event includes event description, status, attributes gathered from the event, and decision points at which to notify the Post of a change in plan for a mail piece (e.g., if it is too late do not deliver). The postal physical process 30 includes sensors 32 for detecting information about the mail piece, actuators 34 for acting on the information, communication means 36 for sending messages to any parties to the delivery process, a decision function processor 38 for evaluating requested actions from the planned events database, and system data (Post machine ID, time and date, location). The Provider's infrastructure 40 includes a meter database 42 and an events database 44. The Post's information infrastructure 50 includes a planned events database 52 and a transaction database 54. There is a Postal financial institution 60 and a Provider financial institution 70 for processing funds according to the processing within the closed loop postage metering system 10. Finally, recipient 80 is part of the closed loop postage metering system 10.

In accordance with the present invention, information is sent back to meter 22 when an event occurs during the mail processing, i.e., when sensors 22 detect the mail piece 25 at a particular phase of the postal process 30. The sensors 32 then gather information from the mail piece 25, from a postal database 54 and from the infrastructure 50 (e.g., date/time/location). The sensed information is fed into a decision function 38 that determines whether any service is required. If action is required on the mail piece 25, the required actuators 34 are activated to modify the mail piece 25 or the mail processing 30. If the required service involves a message that should be sent to one of the parties involved (Post, mailer, meter, recipient, Provider) then the message is formatted and sent.

Figure 3:
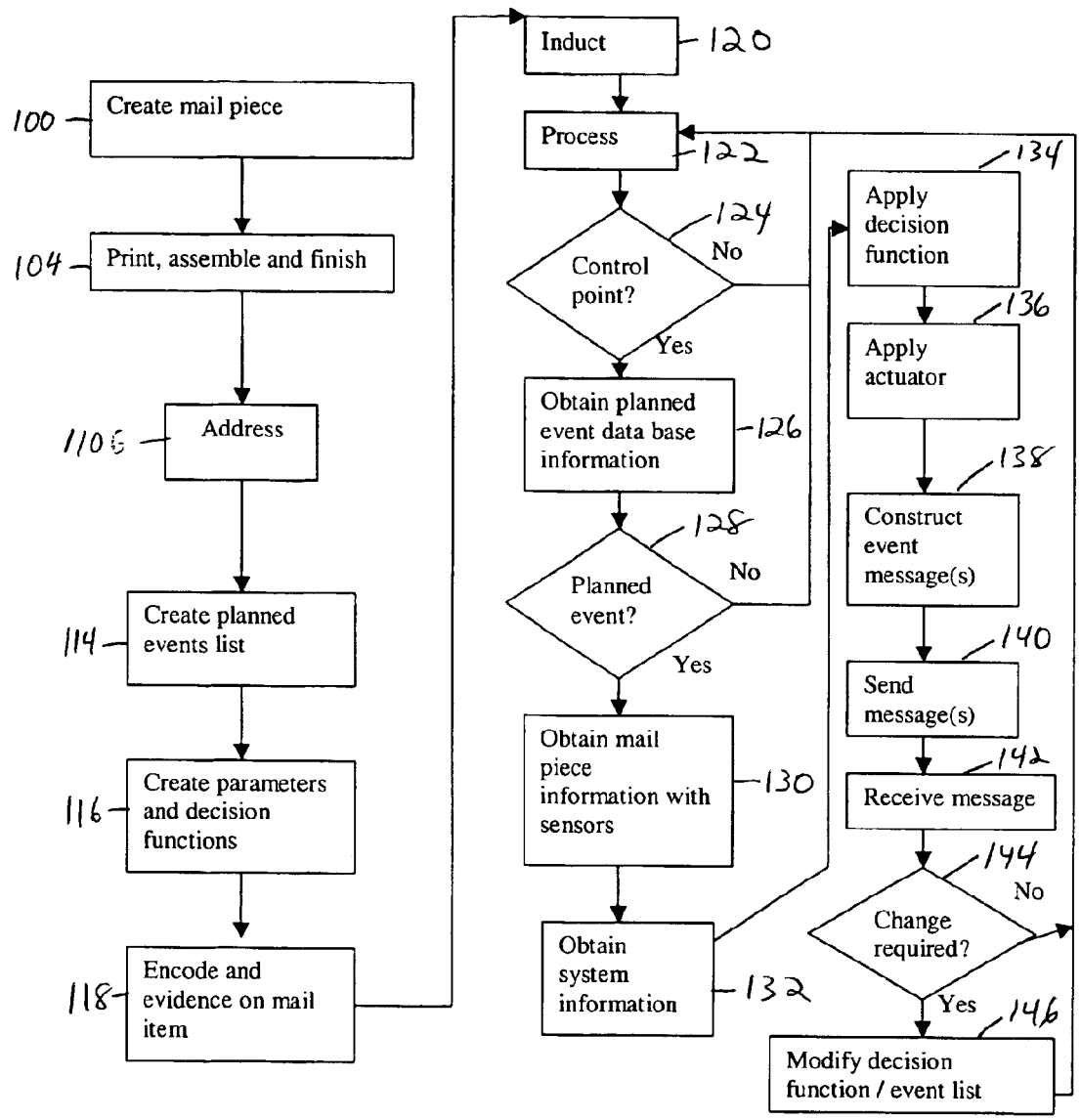
FIG. 3 is a flowchart showing the processes of the closed loop postage metering system of FIGS. 1 and 2.

Referring now to FIG. 3, a flowchart representative of the processes of the present invention shows the processes of collecting information while creating the mail piece, inducting the mail piece, identifying any planned events, collecting data at the planned events, acting on the collected data and sending any required messages to the networked meter through the Provider. At step 100, a mail piece creation begins and at step 104, the documents that make up the mail piece are printed, assembled and finished. At step 110, the envelope of the mail piece is addressed. At step 114, the meter creates a planned events list including requests for special services based on inputs from the mailer, Post or Provider. Then, at step 116, the meter creates parameters and decision functions corresponding to the events list created in the previous step. The parameters and decision functions may be created based on interactive inputs by the mailer. At step 118, the meter accounts for postage payment and encodes the evidence of postage payment and also encodes the events list, parameters and decision functions for printing on the mail piece or for communicating to the Posts through a separate channel such as network 5. The communicated information could be sent through a separate printed document possibly with a barcode, such as a statement of mailing. SHOULD THE FLOW CHART INCLUDE SELECTION OF SPECIAL SERVICES AND SHOULD THEY BE ENCODED IN THE CONTROL FUNCTION 2-D BAR CODE?? [THE DECISION FUNCTIONS INCLUDE THE SPECIAL SERVICES added at step 114] At step 120 the mail piece is inducted into the mail stream.

Once inducted into the mail stream, the Post infrastructure begins to process the mail piece at step 122. At step 124, during the processing by various equipment and personnel within the Post infrastructure, a determination is made whether the mail piece is at a control point. Control points are any systems that detect or scan the mail piece or its container. Examples of control points include postal processing scanners, mailer's processing system, recipient's processing system or the postal carrier. If not, the processing continues at step 122. If yes, then at step 126, the Post infrastructure obtains information from a planned event database. If it is determined, at step 128, that this is a planned event then at step 130, the infrastructure obtains mail piece information using sensors on the infrastructure process the mail at the control point. At step 132, the infrastructure makes note of the system information corresponding to the control point. At step 134, the infrastructure applies a decision function based on the control information read from the mail piece. At step 136, the infrastructure applies an actuator associated with the decision function. At step 138, the infrastructure constructs one or more event messages indicating the decision function and actuator applied. At step 140, the infrastructure sends the message to the meter through the Provider infrastructure. At step 144, the meter decides on whether a change is desired based on the message received at 142. This decision preferably is made based on an interactive input by the mailer to the meter. However, the meter can be configured to default to preset decisions at the discretion of the mailer. If no change is required, a message is returned from the meter to the Post infrastructure (through the Provider infrastructure) that no change is required and, at step 122, processing continues. If a change is required, then at step 146 the decision function and event list are modified and a message is sent to the Post infrastructure indicating this, and, at step 122, processing continues. If it is determined, at step 128, that this is not a planned event then the Post infrastructure begins processing the next mail piece at step 122.

As a result of the present invention, Posts can offer a wider range of services and more flexible services. Mailers can be automatically reimbursed for over-payments or for payments for special services that were not performed within predetermined parameters. Posts can be automatically compensated for underpayment by the mailer. Because the same metering system is employed for postage payment evidencing, payment for underpaid postage and refund for overpaid postage, there is a significant improvement in the efficiency of the system. Posts could offer services where the final payment is determined after acceptance and still have the efficiency of metered payment. Examples of when refund accounting would occur are: service agreement not met, piece delivered later than guaranteed, delivery confirmation not obtained, discount due, mail piece damaged, overpaid for requested service. In particular, the Post may not be able to provide a service because a mail piece was not scanned at the appropriate point. Examples of when an additional charge would occur are: unwarranted discount claimed; overweight mail piece, additional cost because a recipient was not available, and address correction required to deliver a mail piece.

Figure 4:
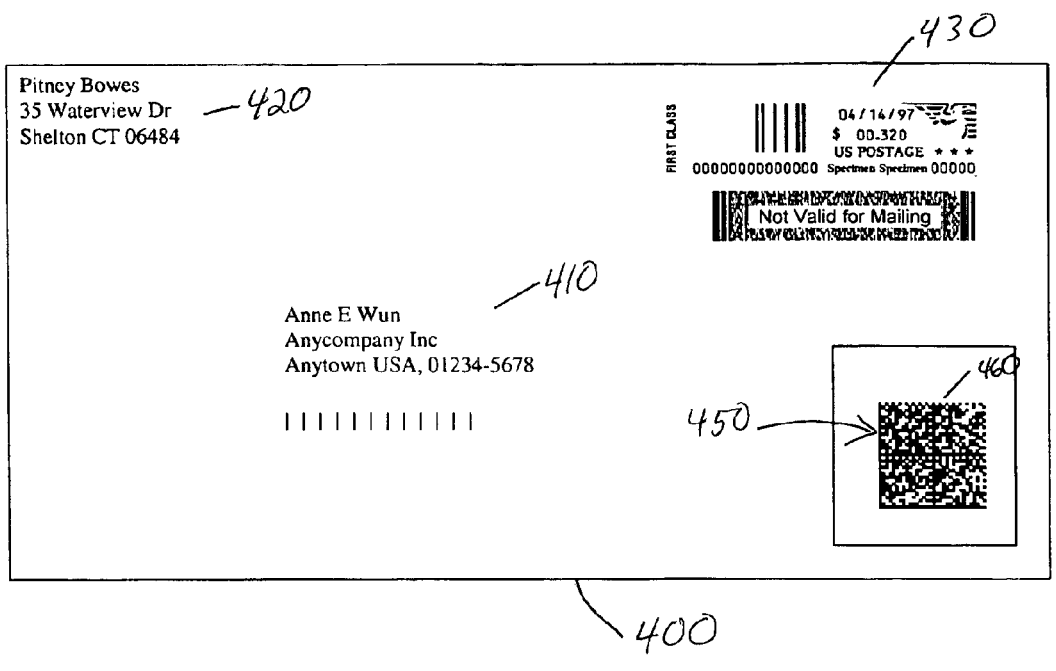
FIG. 4 is a representative mail piece including control information printed thereon.

An intelligent mail piece is a mail piece that instructs both the service provider (Post, carrier, third party) and recipient about all actions desired by the sender and required by the service provider and contains or refers to all information needed to perform such actions. Referring now to FIG. 4, the intelligent mail piece is shown as an envelope 400 that includes typical recipient address block 410, return address block 420 and postage payment block 430, which is shown in the form of a metered IBIP indicium. Alternative forms of postage payment include stamps, permit or any other acceptable form of postage evidence. In accordance with the present invention, the intelligent mail piece further includes control information 450, which is printed on envelope 400 as part of a 2-D bar code 460. Control information 450 contains or refers to all information needed to perform all requested actions. Alternatively, the control information can be included in one of the other bar codes on the mail piece, for example in the indicium bar code or bar code in the address block 410.

It will be understood by those skilled in the art, that the present invention is suitable for use with any open or closed networked metering system, such as the DM Series meters and the ClickStamp Online metering system, both being manufactured by Pitney Bowes Inc. of Stamford, Conn., with Pitney Bowes Inc. being the Provider. While the present invention has been described with respect to a closed loop postage metering system and method, it should be understood that the present invention is not so limited and can be utilized with any carrier or shipping system and method that performs financial transactions, such as, payments and refunds. Those skilled in the art will also recognize that various modifications can be made without departing from the spirit of the present invention.

Figure 5:
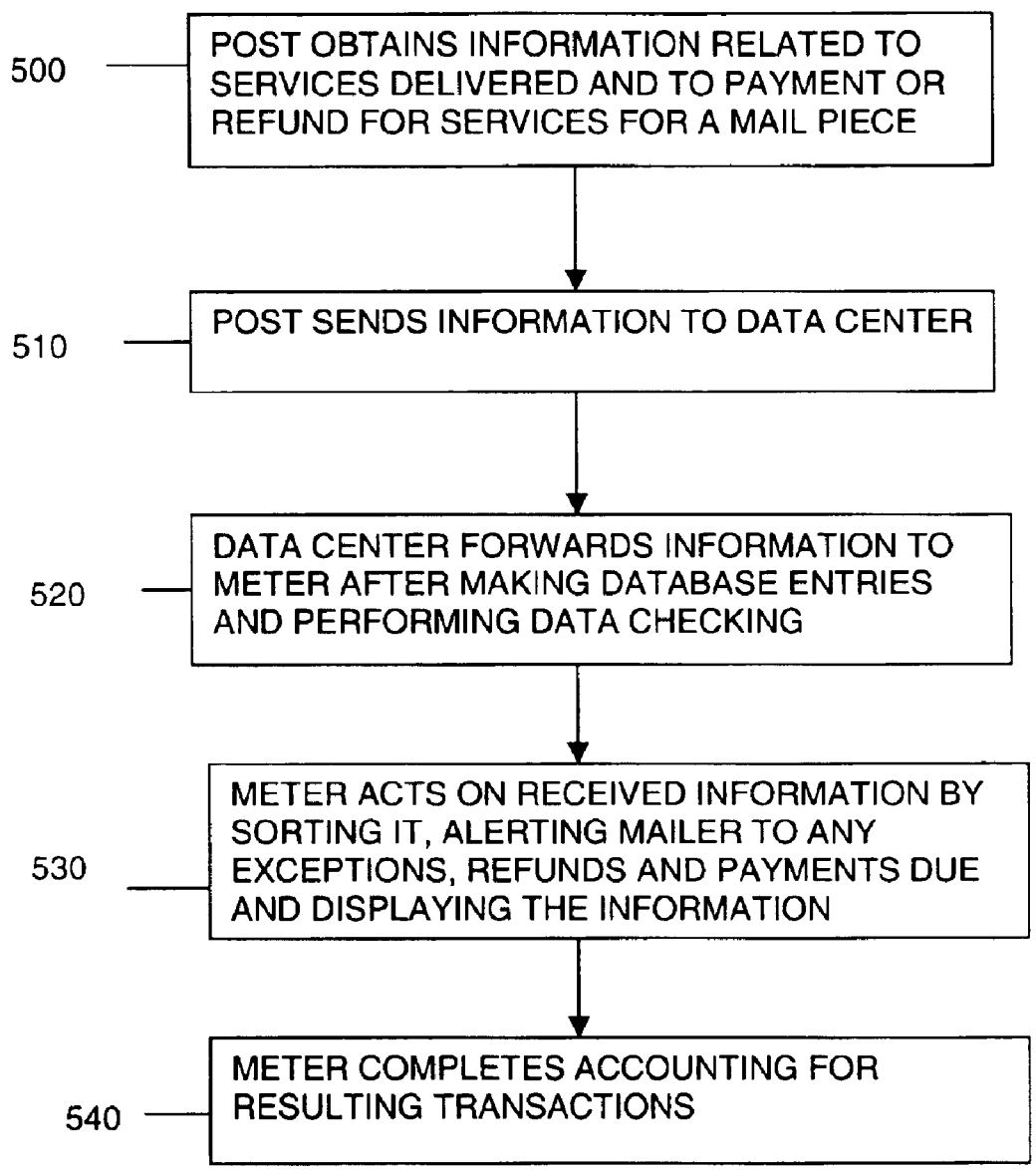
FIG. 5 is a flow chart of information relating to the processing of a mail piece being sent from the Post to the meter in accordance with the present invention.

Feedback of information related to services delivered and to payment or refund for services is provided to the meter from a data center, such as the Provider's data center. Referring now to FIG. 5, the Post, at step 500, obtains the information during its normal processing of the mail, for example, as the mail is processed through sorting equipment. At step 510, the Post then sends the information about mail, which was evidenced by a particular meter, to a data center that administers the postage account of that particular meter. The information may be sent in various known electronic forms of communication, including to an e-mail account assigned to the particular meter, such as MeterNumber@pb.com. At step 520, the data center then forwards the information to the meter after making any required database entries and performing any required data checking. At step 530, the meter then acts on the received information by sorting it, alerting the mailer to any exceptions, refunds and payments due and displaying the information. At step 540, the meter completes the accounting for the resulting transactions. The system allows for automatic metering of payment in cases where the final price depends on information not available at the time of mail production. Alternatively, any accounting adjustments could be made by the Provider infrastructure.

One result of employing the present invention for completing the accounting for underpaid and overpaid transactions is a significant improvement in efficiency, accountability and satisfaction of the mail processing system. Mailers can be automatically reimbursed for over payments or for payments for special services that were not performed within predetermined parameters. Posts can automatically charge for underpayment. Another result of the present invention, Posts can offer flexible charges for services depending on parameters such as availability of postal resources for completing the service. Posts can charge for attempted services such as Friday delivery, and provide a refund if they do not achieve Friday delivery for a particular mail piece or for a predetermined percentage of the mail pieces. Further, Posts can charge for requested tracking services and provide a refund if they are unable to scan the mail piece. Another result of the present invention is that Posts can offer a wider range of services. One example of a new service enabled by the present invention is the return of a received package using payment through the mailer's meter. The package recipient receives a meter number and authenticated code from the mailer's meter and places the code on the package to pay for return postage. Another example of a new service is changing a delivery address while the mail is in the mail processing system. Another example of a new service is the Post can scan all mail pieces with unique identifiers, even if they are not labeled for tracking, and store the data in a tracking database. If a sender or recipient requests tracking information about that mail piece, then the sender's or recipient's meter can be charged for the service.

Figure 6:
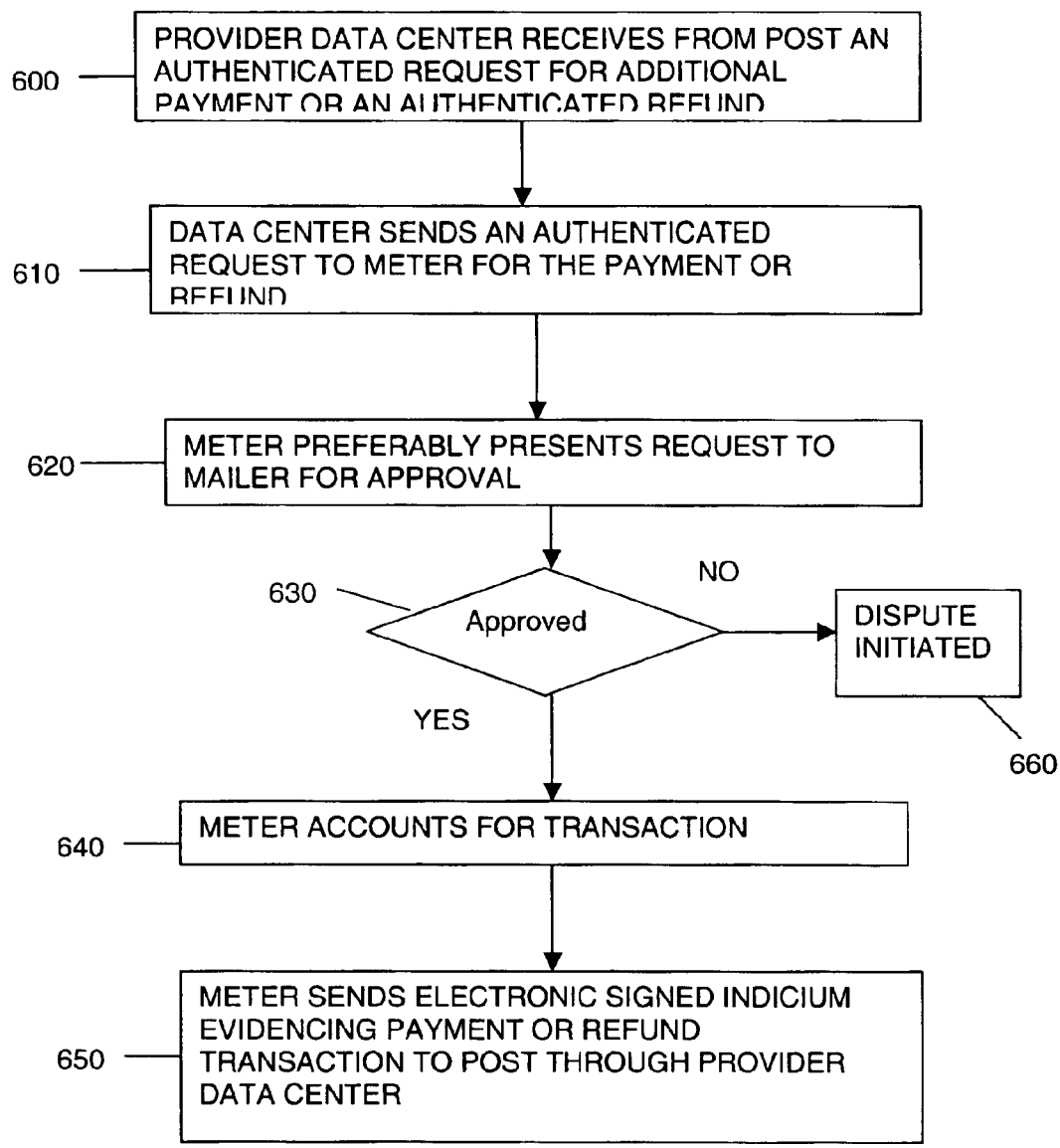
FIG. 6 is a flow chart of the meter receiving an authenticated request for payment or refund from the Post and the meter acting on the request.

In accordance with the present invention, financial transactions for underpayment are completed at the meter by debiting the meter registers. Referring now to FIG. 6, the Provider data center, at step 600, receives from the Post an authenticated request for additional payment or an authenticated refund. The request indicates the mail involved, the meter that evidenced postage payment for the mail and the reason for the additional or reduced charge. At step 610, the data center sends an authenticated request to the meter for the payment or refund. At step 620, the meter preferably presents the request to the mailer for approval. If approved, at step 640, the meter accounts for the transaction, and at step 650, the meter then sends an electronic signed indicium evidencing the payment or refund transaction to the Post through the Provider data center. Alternatively, refunds and additional charges may, on authenticated approval from the mailer through the meter, be completed using the meter refill system at the Provider data center. In this way, the Post can use one funds transaction with the Provider data center to account for all underpayments and overpayments. Having these transactions occur through the Provider data center is an advantage because the Post does not have infrastructure to manage many individual refunds or payments for underrated mail effectively. If the request is not approved at step 630, then at step 660, a dispute is initiated.

Since information about the mail associated with a meter is sent back to the meter, the meter becomes a natural center for organizing information about mailings. This is especially true for small businesses. The meter can send data to a local PC for display. The meter would then be providing accounting information and security services such as decrypting and authenticating messages from the Post.

The following are examples of attributes that may be collected when an event occurs: Event Information, such as time, place, type, and event specific data; Party Information, such as recipient name and email address, sender name and email address, actual recipient who accepted the mail piece, carrier, and delivery person ID; Mail Piece Information, such as destination address, origin address, ZIP Code, POSTNET code, PLANET Code, ID-Tag, FIM, indicium, dimensions, weight, image, and condition.

The following are examples of traditional events that may trigger the collection of information to be sent to a meter:

a. Respond to message contents
b. Obtain/verify/cleanse/apply/read recipient address
c. Rate mail piece
   i. Select special services
   ii. Weigh mail piece
   iii. Determine discount
d. Generate/apply Indicium
e. Apply mailer mail piece ID (e.g., PLANET code)
f. Tray mail piece (associate mail piece with tray ID)
g. Presort mail piece
h. Submit mail piece
i. Accept mail piece
j. Face mail piece
k. Sort mail piece
l. Sort tray
m. Break tray
n. Final carrier sequence sort
o. Deliver
p. Obtain delivery confirmation
q. Perform OCR
r. Perform remote encoding
s. Apply/read postal mail piece ID
t. Read address
u. Cleanse address
v. Apply change of address
w. Track mail piece
x. Read postal code
y. Open mail piece
z. Negative events, such as damaged mail piece.

Events may be classified as: Change-of-Form (for example: electronic to paper, i.e., computerized content conversion to paper form, insertion into a carrier envelope and finishing into a mailable item; or paper to electronic, i.e., scanning of the paper-based materials into computerized format); Change or Loss-of-Control (for example: induction of a mail item into the postal stream such as depositing the mail item into a collection box or handing it over to a postal retail clerk; delivery of the mail item into the recipient's mail box or handing it over to the recipient; or loss of the mail item during processing or transportation); Transition (departure and/or arrival) from one identifiable location to another (for example: transportation of the mail item from one postal or mailer's facility to another or from one city to another); Processing by identifiable pieces of postal and/or recipient's processing equipment or postal and/or recipient's personnel (for example: processing by culler, facer/canceller, OCR or bar-code sorter, or manual sorting, scanning or data entry, mail re-direction in the case of wrong address including evidencing of correct address etc.); and Special Events defined by mailer's, Post's or recipient's application (for example: mail item damage, mail item opening, signing after the mail receipt, business reply envelope included into mail item induction into the postal stream (by the recipient), mail item packaging or containerization, mail item return to the sender, mail item payment/money transfer etc.)

The closed loop postage metering system 10 allows the Post to offer new conditional value-added services that request alternative action if a desired event does not occur. The following are four examples of conditional value-added services. If a mail item cannot be delivered, the Post will destroy the mail item and send back to the mailer data (such as a digital image) about the mail item destroyed. If a mail item cannot be delivered before a particular date and time, the Post will return the mail item and credit the mailer's account. If a given mail item is located in a particular Post facility, do not deliver the mail item and send the identity of the mail item to mailer's e-mail address. Finally, if a given mail item is located in a particular Post facility after a specific date, send the mail item to an address other than the one printed on the mail item.

Referring now to FIG. 7, a table of control functions related to conditional value-added services is shown. For each event, a different control function is performed. At Event 1 a mail item is detected and identified. The event information is stored in the Postal infrastructure 50. At Event 2, a remittance mail piece from a customer to a biller is intercepted and opened. A digitally signed and encrypted image of the content is sent to the biller. At Event 3, a digitally signed confirmation of delivery to a particular recipient is delivered over network 5 to the sender. The following are examples of attributes that may be collected when an event occurs: event information, such as time, place, type, and event specific data; Party Information, such as recipient name and email address, sender name and email address, actual recipient who accepted the mail piece, carrier, and delivery person ID; Mail Piece Information, such as destination address, origin address, ZIP Code, POSTNET code, PLANET Code, ID-Tag, FIM, indicium, dimensions, weight, image, and condition.

The protocol for each service depends on the security needs of the service. If at an event, the Post determines that additional postage is required, the Post generates a message identifying the reason for additional payment, the amount of additional payment, a unique code associated with the transaction, and a signature authenticating the message. The meter authenticates the request and presents it to the mailer. Upon receiving authorization from the mailer, the meter generates a signed Indicium for the additional postage. Alternatively, the Provider can authenticate the message and generate a signed request to the meter. If the Postal Service determines that a refund is due, the Postal service generates a signed message with a unique transaction code authorizing the refund. Either the Provider data center or the meter authenticates the refund authorization message. Postage is then added either to the descending register, or to the mailer's account. Accounting for overpayment or underpayment is then handled by known means between the Post and the Provider.

It will be understood by those skilled in the art that the meter can be configured to automatically authorize the payment of additional postage or to default to automatic authorization if the mailer does not acknowledge the displayed request after a predetermined time. It will also be understood that certain planned events that provide information about a mail piece or that modify processing of the mail piece may need to be signed by any of the parties involved to authenticate the transaction.

As previously described, the present invention allows the mailer and/or the recipient to request additional or modified services during processing of a mail piece and allows the Post to charge the mailer, or even the recipient for these services. The services may include changing the processing of the mail piece. Furthermore, the closed loop postage metering system of the present invention enables more precise methods of paying for services even when multiple carriers handle a mail piece, including the processing of international mail. The present invention allows Posts and mailers more precise and dynamic control of mail and over payment and discounts for mail.

Examples of Additional or Modified Services Performed

One example of additional or modified service that may be requested is delivery on rural routes. There can be a significant cost associated with daily delivery on rural routes or other routes with long distances between delivery points. The closed loop postage metering system can offer discounts to the mailer or to the recipient for allowing and accepting an offer of delayed delivery or an offer of delivery by an alternate carrier that happens to be delivering on a particular rural route that day.

Another example of a modified service is one that may be requested by a recipient or performed for a recipient. The recipient may request that the Post process a mail piece differently based on information about the mail piece, for example, a piece from a particular mailer should be delivered with special handling, such as deliver all my packages from a particular retailer as priority, or deliver my packages within 3 days depending upon when it is more convenient for the carrier. Either the recipient or the mailer can be charged for extra service or credited for reduced service. Furthermore, the Post, knowing about the recipient's mailing habits, may offer to deliver mail to the recipient based on these habits. For example, if the recipient pays bills on first of month, the Post will make an effort to get the bill there a few days before the first of the month, otherwise they can delay delivery until it is convenient.

In accordance with the present invention, the Post can charge the mailer or the recipient for unexpected additional services such as: forwarding to another address, multiple delivery attempts, and rapid temporary change-of-address. The Post can extend discounts to mailers after the fact, even for events that they would not normally get a discount such as: when the mailer produced a sufficient number of properly bar coded mail pieces but did not claim a discount. Furthermore, the closed loop system of the present invention can pay individual carriers in the case of multi-carrier routing, such as: using Federal Express to deliver a mail piece that was picked up by the Post.

The present invention makes payments for international mail processing more precise. The current international mail processing system compares the amount of mail entering and leaving a country over an accounting period and then balances revenues by transferring funds from a country that produces more mail pieces than it receives. This process cannot handle discounts or charges for special services.

The present invention allows for processing discounts for mail originating in one country and sorted appropriately for the destination country and for other worksharing operations. Through the closed loop postage metering system, the destination Post would provide the discounts and initiate additional charges. The closed loop postage metering system would manage the international funds transfer to the appropriate Posts.

Another service that may be processed using the present invention is a readdressing service, wherein the Post determines the recipient and prints the recipient's name on a mail piece, thus providing anonymous, targeted personally addressed mailings preserving privacy for recipient. This service may include a font type in the request. Demographic information may be used by the Post to pick where to send the mail piece without providing information to mailer, for example, don't send gardening ads to apartment buildings, a recipient wants to receive ads for new cars. The Post may charge extra for the "hot prospects". The Post may realize a commission for finding prospects: e.g., if recipient sends a reply card back through the mail then the Post may charge a commission that is charged against the meter in the closed loop postage metering system.

Workshare Verification

In accordance with the preferred embodiment of the present invention, the closed loop postage metering system can be used to monitor the mailer's compliance in generating mail and the performance of the mail reading equipment during processing of the mail. The Post can use the compiled results from the system to provide rebates or to issue surcharges to mailers accordingly. Mailers may use the results to dispute additional charges or claim additional discounts.

The present invention provides a system that evaluates each mail piece in a batch during normal mail processing for compliance with workshare discount requirements. One area of compliance verification is readability of bar codes such as ZIP Codes, indicia bar codes, PLANET Codes for the CONFIRM service and delivery confirmation. A second area of compliance verification is readability of addresses, human-readable indicia information and other mail piece data. Yet another area is correctness of addresses and correctness of presorting. The Post tracks the mail from a batch into the mail processing system, and measures the performance during processing. The results of the compliance verification are used to determine the final payment for the batch of mail. The system further monitors performance of postal processing equipment and allows for correction of a surcharge due to poorly performing equipment. The funds for the difference between the claimed and prepaid discount rate and the full rate may be held in an escrow account or a trusted device to simplify and assure appropriate payment.

The system simplifies acceptance for both the mailer and the Post. It improves the accuracy of workshare discounts and improves the accuracy of surcharges applied when the workshare quality does not meet the levels required for the claimed discount. Further, the system simplifies correction of the payment amount. The following paragraphs provide examples of workshare discounts.

Two pre-barcoded and presorted to five digits mail streams qualify for a discount. The first stream is mail that is pre-barcoded and presorted and destined for the same general mail facility (GMF), i.e., a three-digit code, such as a utility bill. The second stream is mail that is pre-barcoded and presorted to five digits with destination generally outside the local GMF such as a credit card billing statements. The second stream goes straight to the transportation system and arrives at the destination GMF as "managed mail".

There is a workshare discount for 9-digit and 11-digit presorted mail. Mail presorted to 11-digit goes to a delivery barcode sorter (DBCS) which sorts into multiple pockets delivery. A mail batch presorted to 9-digits goes to barcode sorter (BCS) which sorts by route. If a presort is good enough quality the presorted mail is sent to the carrier sequence delivery barcode sorter (CSDBCS) which prepares the mail for delivery. The CSDBCS is a three-pass system that sorts all the mail to carrier sequence with tabs for different stops. All mail goes through at least one BCS, CSDBCS, or DBCS.

The Post is building a new information model that supports drop ship discounts for delivery to the destination GMF. This mail bypasses postal transportation costs and is entitled to additional discounts.

Figure 8:
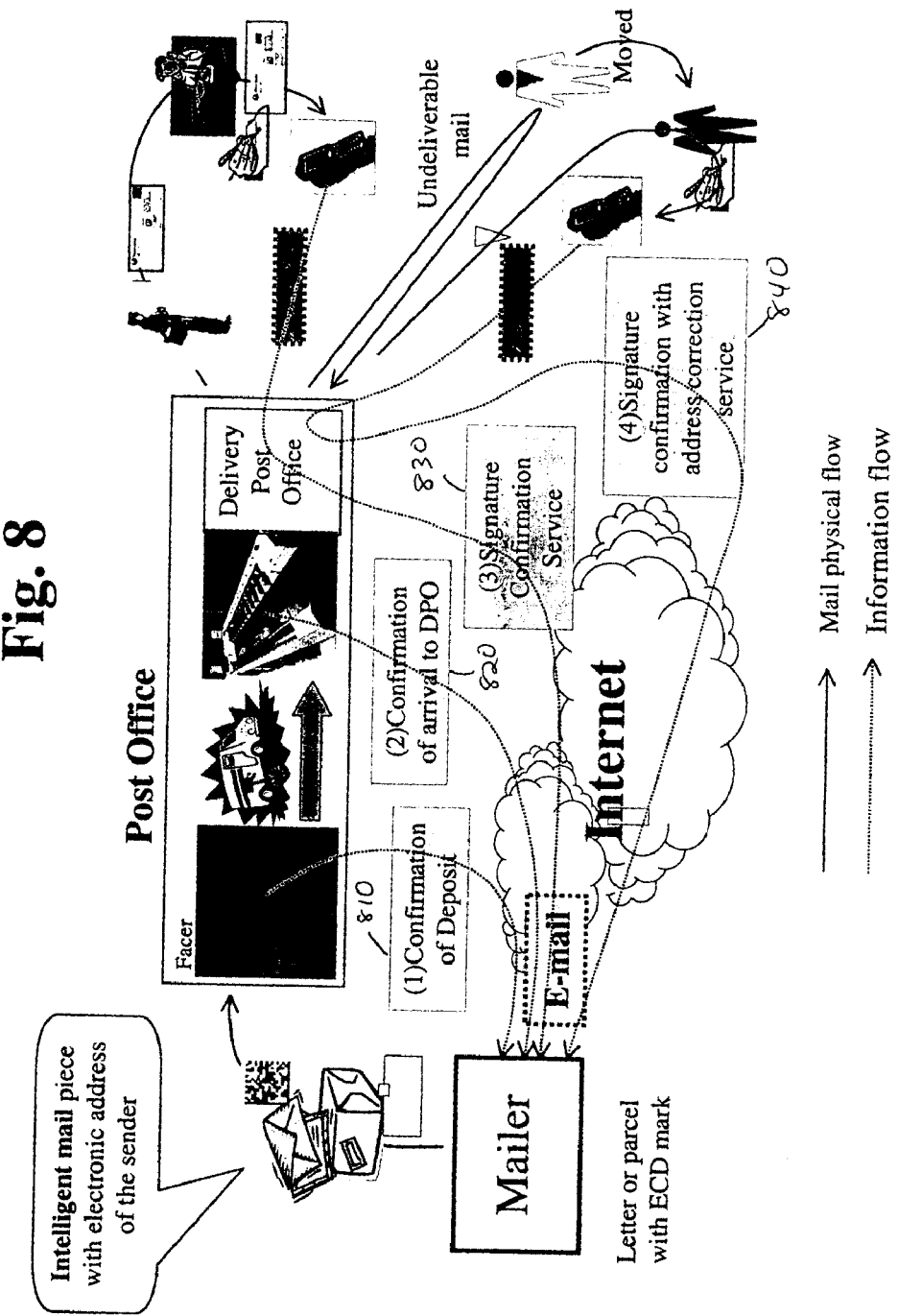
FIG. 8 is a block diagram of electronic confirmation services that may be eligible for discounts using the closed loop postage metering system of FIGS. 1 and 2.

Other potential areas for discounts include using electronic messaging for providing information about the mail. Referring now to FIG. 8, a block diagram shows various electronic confirmation services that are possible for an intelligent mail piece that includes an electronic address of the sender. Such electronic confirmation services include confirmation of deposit 810, confirmation of arrival at a delivery Post Office 820, general delivery confirmation by email (not shown) through network 5, signature confirmation 830, and signature confirmation with address correction service 840. It will be understood that other forms of electronic communications may be used as alternatives to e-mail. It will further be understood that tracking a mail piece by web or e-mail is another service available.

For each type of discount information collected at one or more events in the mail processing system, the present invention provides the evidence for accepting or rejecting the claimed discount. The following examples demonstrate how the present invention improves the workshare discount verification.

In one example, the workshare discount is for information on mail piece (e.g., barcode, email address on mail piece, CONFIRM and/or unique mail piece ID). The current verification process tests, when a mail batch is accepted into the mail stream, for the presence of information on a sample of the mail batch and compliance of information in the sample with quality requirements. The present invention provides the capability for a new verification process tests that tests each mail piece of the mail batch during the processing of the mail batch by associating each mail piece with a batch, determining the presence of required information when needed at a processing machine, and determining quality, readability of required information at the processing machine.

In another example, the workshare discount is for a mail item in a group with the same destination (Container of presorted 5, 9, or 11-digit mail, mail drop shipped at destination GMF). The current verification process samples the mail at acceptance, verifying that the group is delivered in the right place and that there is consistency between the information on the sampled mail piece from the group and the location the group is verified. The present invention provides the capability for a new verification process that looks at the mail when a group is broken up for individual processing. The new process associates each mail piece from the group with the group, verifies that each individual item is in the right place when separated from the group and processed, and if there is an information label on the container then verifies that the mail in the container is consistent with the label when the container is broken up.

In accordance with the present invention, the results of the verification tests with regard to the worksharing quality during processing determine the applicable discount for a mail batch. Rather than reject the discount for the whole batch, the discount can be a function of the measured quality. The rich information available about the processing system helps to identify machines that are not performing well and helps provide guidance to mailers to correct problems that add cost to Post processing. Thus the proposed system gives incentives to mailers and the Post to make the system more efficient.

The quality verification parameter for each piece can be binary (pass/fail) or can be multi-valued: for example, the data read correctly on two of three machines the mail piece passed through. There can be separate quality parameters for each aspect that qualifies for a discount.

There are several methods to deal with the fact that in the verification system the actual price for the mailing is not known when the Post accepts it. The mailer could pay the discount price and be billed for the additional surcharge. The mailer could pay the full rate and receive a refund for the allowed discount. The mailer could pay an estimated value, which is based on historical performance, and then reconcile later. In accordance with the present invention, the mailer uses the closed loop postage meter system, which allows the Post to withdraw additional funds from an account or a metering device. An alternate solution is to use funds held in escrow equal to the difference between full rate and claimed discount rate. The funds could be in an account or in a metering device. The Post would provide evidence of poor workshare quality to release funds from escrow.

The present invention requires the ability to identify each mail piece in a batch as a member of a discounted batch when performing the verification test. Two general methods are reading a unique ID from the mail piece, or tracking the mail piece from a tray at least until it is tested. The mailer could apply the unique ID, for example, a unique indicium applied to the mail piece. Alternatively, the Post could apply the unique ID immediately after breaking a labeled container of mail pieces of the batch. A side benefit of this process is that the Post will know the exact count of the pieces in the batch.

Figure 9:
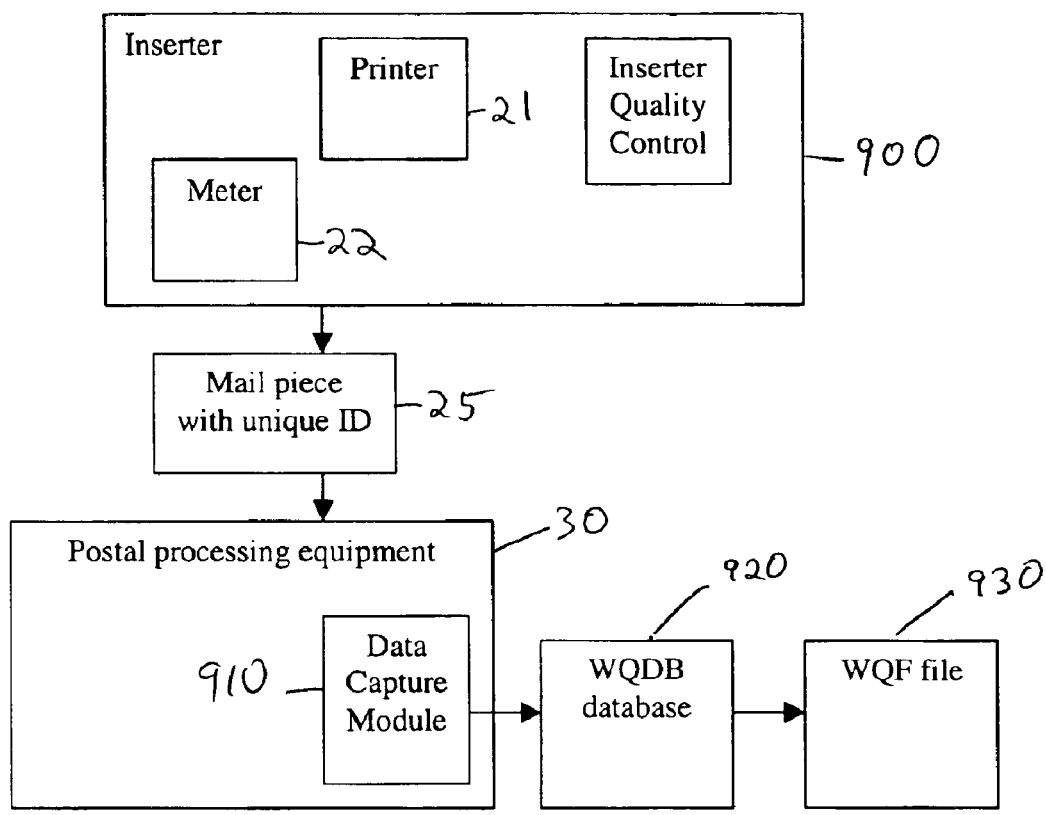
FIG. 9 is a block diagram of a workshare system that provides information for the closed loop postage metering system of FIGS. 1 and 2.

Referring now to FIG. 9, mail piece 25 is prepared by inserter system 900 which includes a printer 21 for printing a unique ID on the mail piece 25 and meter 22 for evidencing postage payment and accounting for postage based on workshare discounts. During mail processing by the postal processing equipment 30, a data capture module 910 collects the data that justifies any corrections to a claimed discount. The collected data is stored in a worksharing quality database 920 (WQDB). At each event where a workshare quality parameter is determined, the Post identifies the batch associated with the mail piece and creates an entry in the WQDB 920. An example of a WQDB is provided in Table 1.

TABLE 1

| ID of owner (responsible for payment) and owner machine | Postal machine ID | ID of conveyance unit (including batch ID) | Quality parameter- Binary or multi- valued | Quality degradation cause |
| --- | --- | --- | --- | --- |
| XYZ Company | DBCS 01234 | Tray 5678 | Bar code readability failed | Poor contrast |

One use of the WQDB 920 is to identify process problems such as machines that are performing below expectations. Problem machines can be identified by looking at the statistical performance of the individual machines, or by comparing performance of two machines on mail pieces that are processed in both. Problem machines can be scheduled for maintenance before the performance degrades to the point of causing system failures.

After the processing of the batch is completed, the data for the batch is extracted from the WQDB 920 and placed in a workshare quality file 930 (WQF) for the batch. The Post calculates the final approved discount. This calculation includes surcharges for pieces that failed to provide workshare advantages. The performance results for the individual machines that handled the mail piece can be used as an input parameter for correcting the surcharge. For example, if a machine generally performs poorly, it is not used as a strong justification for a surcharge. The result is time-stamped, signed and forwarded to the payment system for reconciliation.

The WQF 930 can be sent to the mailer. The mailer can use the information to identify problems in his process that interfere with postal processing. If the data indicates that bar codes are not accurately printed, the mailer can adjust the printer. If the data indicates that the print contrast is too low, the mailer can employ darker ink, lighter envelopes or heavier printing.

Dispute resolution involves presenting evidence to a third party to determine the final payment. For example, indicia may be unreadable because they have been cancelled. The Post should provide on a sampling basis images of unreadable mail pieces to provide evidence that they were unreadable because of poor print quality and not because of damage produced by the Post.

Figure 10:
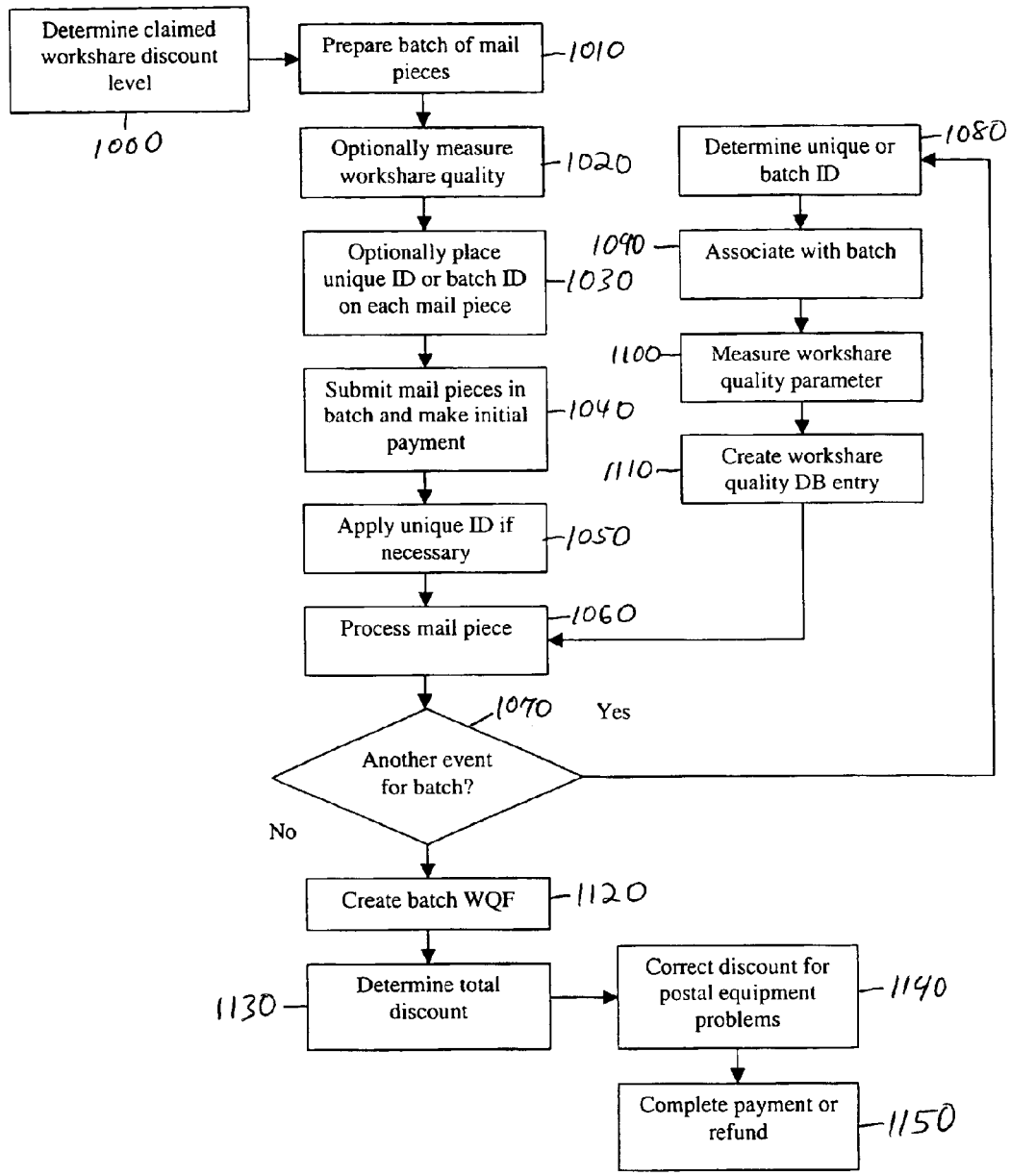
FIG. 10 is a flowchart showing a workshare process in accordance with the present invention.

Referring now to FIG. 10, the process flow for determining workshare discounts is shown. At step 1000, the workshare discount level is determined. At step 1010, a batch of mail is prepared using inserter system 900. At step 1020, the workshare quality is measured by measuring compliance with postal requirments. One area of measuring compliance is readability of bar codes such as ZIP Codes, indicia bar codes, PLANET Codes for the CONFIRM service and delivery confirmation. A second area of measuring compliance is readability of addresses, human-readable indicia information and other mail piece data. Yet another area is measuring correctness of addresses and correctness of presorting. At step 1030, a unique ID or batch ID is placed on each mail piece in the batch. At step 1040, the batch of mail is inducted into the mail stream and an initial payment based on the determined workshare discount level for the batch is made. At step 1050, the Post applies a unique ID on each mail piece if necessary, i.e., if one was not applied by the mailer. At step 1060, the Post infrastructure process the mail piece. At step 1070, the infrastructure of the postal processing determines whether an event has occurred for the batch. If an event has occurred, then at step 1080, sensors determine the unique or batch ID on the mail piece. At step 1090, the mail piece is associated with the batch. At step 1100, the Post infrastructure measures the workshare quality parameter then, at step 1110, creates a workshare quality database entry and continues processing the mail piece at step 1060. If a batch event has not occurred at step 1070, then, at step 1120 a workshare quality file is created. At step 1130, a total discount is determined and then corrected at step 1140 to account for postal equipment problems. Finally, at step 1150, the additional payment is requested from the meter or a refund is sent to the meter.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A closed loop postage metering system comprising:

a meter provider infrastructure including a meter database;

a postal infrastructure in operative communication with the meter provider infrastructure, the postal infrastructure including equipment and processes for submission, processing, transporting and delivery of a mail piece;

a mailer system in operative communication with the meter provider infrastructure and the postal infrastructure, the mailer system including a postage meter, the postage meter accounting for and printing postage value for the mail piece and printing on the mail piece information identifying services requested for the mail piece;

wherein the postal infrastructure determines an adjusted postage value for the mail piece based on the occurrence of events related to the requested services during the processing the mail piece; and wherein the postal infrastructure sends the adjusted postage value to the meter for the meter to account for the adjusted postage value.

2. The system of claim 1 wherein the meter provider infrastructure includes an events database and the postal infrastructure includes a planned events database and a transaction database used during the processing of the mail items.

3. The system of claim 1 wherein the requested services are conditioned on the occurrence of at least one certain event.

4. A method for processing mail items, the method comprising the steps of:

creating a mail piece;

creating a list of planned events associated with the mail piece;

creating parameters and decision functions associated with the planned events;

printing on the mail piece by a postage meter mail piece information including a unique identification of the mail piece, evidence of postage payment identification of the postage meter and services requested for the mailpiece;

inducting the mail piece into a postal infrastructure;

scanning the mail piece to determine if one of the planned events has occurred;

if a planned event has occurred obtaining the mail piece information with sensors in the postal infrastructure, the mail piece information including identification of the postage meter; and sending a message to the meter relating to the occurrence of the planned event, the message including the mail piece information.

5. The method of claim 4 comprising the further step of:

accounting by the meter for the occurrence of the planned event.

6. The method of claim 4 comprising the further steps of:

if a planned event has not occurred obtaining the mail piece information with sensors in the postal infrastructure, the mail piece information including identification of the postage meter;

sending a message to the meter relating to the non-occurrence of the planned event; and accounting by the meter for the non-occurrence of the planned event.

7. A method for managing postal workshare discounts, the method comprising the steps of:

prepare a batch of mail in a manner intended for the batch of mail to qualify for certain postal workshare discounts;

applying at least one of a unique mail piece identification or unique batch identification on each mail piece in the batch of mail;

inducting the batch of mail for postal processing by a postal infrastructure;

accounting in a meter for payment for the batch of mail based on an estimated workshare discount and submitting the payment;

determining during the postal processing the actual workshare discount that the batch of mail is entitled to; and sending a correction discount amount to the meter to update the accounting in the meter.

* * * * *